United States Patent [19]

Pugnet

[11] Patent Number: 5,083,037
[45] Date of Patent: Jan. 21, 1992

[54] DEVICE FOR CONTROLLING THE OPERATION OF AT LEAST TWO THERMAL ENGINES COUPLED TO THE SAME DRIVE SHAFT OF AN ALTERNATOR

[75] Inventor: Jean-Marc Pugnet, Le Creusot, France

[73] Assignee: Framatome, Courbevoie, France

[21] Appl. No.: 630,169

[22] Filed: Dec. 19, 1990

[30] Foreign Application Priority Data

Dec. 19, 1989 [FR] France .................. 89 16818

[51] Int. Cl.⁵ .............................................. E02C 6/00
[52] U.S. Cl. .................................................. 290/4 R
[58] Field of Search ................... 307/64; 290/40 R, 14

[56] References Cited

U.S. PATENT DOCUMENTS 3,831,036 8/1974 Pelabon .................................. 307/64
4,498,016 2/1985 Earleson et al. .

OTHER PUBLICATIONS

"Universal speed regulator for IC engine—with load--torque transducer and extra control indicator to improve speed of response"—Week Issued.

Primary Examiner—J. R. Scott
Assistant Examiner—Lawrence E. Colbert
Attorney, Agent, or Firm—Pollock, Vande Sande & Priddy

[57] ABSTRACT

This device for controlling the operation of at least two thermal engines coupled to the same drive shaft of an alternator, comprising a regulator for regulating the rotational speed of the engines and proportional actuators for adjusting the position of a member controlling the injection of fuel into each engine, which are controlled in response to an output signal from the regulator. The device includes a closed-loop servo-control of the position of each control member as a function of the output signal from the regulator.

4 Claims, 7 Drawing Sheets

DEVICE FOR CONTROLLING THE OPERATION OF AT LEAST TWO THERMAL ENGINES COUPLED TO THE SAME DRIVE SHAFT OF AN ALTERNATOR

FIELD OF THE INVENTION

The present invention relates to a device for controlling the operation of at least two thermal engines coupled to the same drive shaft of an alternator.

BACKGROUND OF THE INVENTION

These engines and this alternator are used, for example, in emergency generating units of the state of the art for supplying electricity. These units have a single rotational-speed regulator for the two engines which controls two actuators for adjusting the position of a member controlling the injection of fuel into each engine.

The actuators are connected in series to the output of the regulator, so as to receive the same current in order to ensure a corresponding adjustment of position of the two fuel-injection control members, the purpose of this being to balance the static load distribution on the two engines, without any problem involving dynamics and without pumping.

However, since the actuators are not accurate by virtue of their design, the load distribution between the two engines is more or less arbitrary and the deviations observed are inadmissible.

Also known from the state of the art is another control device which comprises two speed regulators controlled by a load-compensating balance, so as to obtain an equality of the powers delivered by the engines.

However, this device requires an assembly of equipment which is relatively complex and bulky, thus reducing the reliability of this assembly and increasing its production cost.

SUMMARY OF THE INVENTION

The object of the invention is to solve these problems by providing a control device which is simple, reliable and compact and which makes it possible to obtain a balance of the static load distribution on the two engines.

To this end, the subject of the invention is a device for controlling the operation of at least two thermal engines coupled to the same drive shaft of an alternator, comprising means for regulating the rotational speed of the engines and means for adjusting the position of a member controlling the injection of fuel into each engine, which are controlled in response to an output signal from the regulating means, characterised in that it possesses means for the closed-loop servo-control of the position of each control member as a function of the output signal from the regulating means.

Advantageously, the servo-control means comprise a controller of the integral type.

According to other characteristics, the servo-control means comprise, for each engine, means for determining the actual position of the corresponding control member and means for comparing the output signal from these determining means with an output signal from the regulating means which represents the desired theoretical position, the output of the comparison means being connected to the adjustment means in order to compensate any deviation between the actual position and the desired theoretical position.

Likewise advantageously, the servo-control means for each control member receive the same output signal from the regulating means.

BRIEF DESCRIPTION OF THE DRAWINGS

The invention will be better understood from the following description given purely by way of example and with reference to the accompanying drawings, in which.

DESCRIPTION OF PREFERRED EMBODIMENTS

Figure 1:
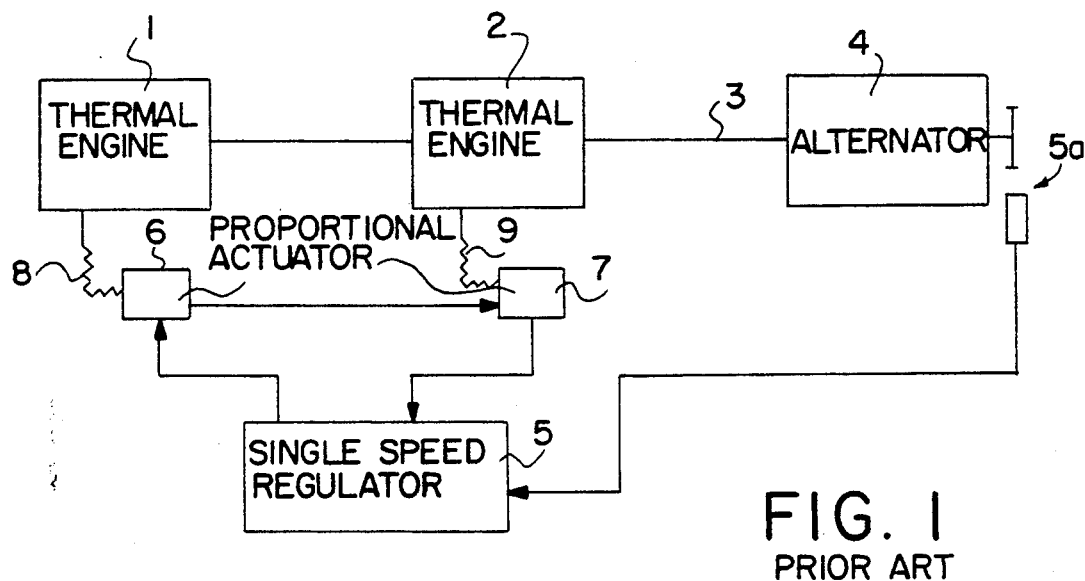
FIG. 1 shows a block diagram illustrating a first embodiment of a control device of the state of the art.

As can be seen from FIG. 1, a first embodiment of an emergency generating unit of the state of the art comprises, for example, two thermal engines 1 and 2 respectively coupled to the same drive shaft 3 of an alternator 4.

As mentioned above, this unit also possesses a single speed regulator 5 which controls two proportional actuators 6 and 7 respectively as a function of the measurement of the rotational speed of the unit supplied by a sensor 5a.

These actuators constitute means for adjusting the position of a member 8, 9 controlling the injection of fuel into each engine, consisting, for example, of a control rack for each engine.

In the state of the art, these actuators 6, 7 are connected in series to the output of the regulator 5 so as to receive the same current and therefore theoretically ensure an identical positioning of the racks in order to obtain a balanced distribution of the load on the engines.

As mentioned above, the actuators are not accurate and the load distribution is not balanced between the two engines.

Figure 2:
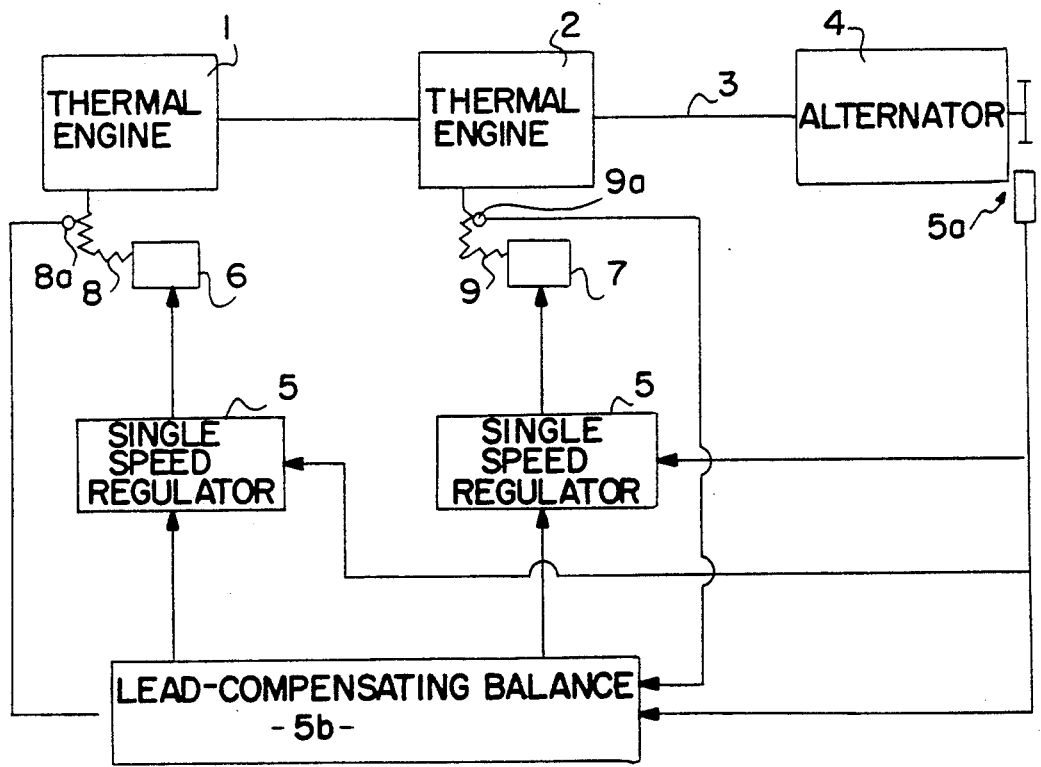
FIG. 2 shows a block diagram illustrating a second embodiment of a control device of the state of the art.

According to a second embodiment shown in FIG. 2, the control devices of the state of the art can also possess a load-compensating balance 5b acting on a regulator 5 associated with each engine.

This balance 5b receives information relating to the rotational speed of the unit from the sensor 5a and relating to the position of the members 8, 9 controlling the injection of fuel into each engine 1 and 2 from position sensors 8a and 9a.

As mentioned above, these devices are relatively bulky and unreliable.

Figure 3:
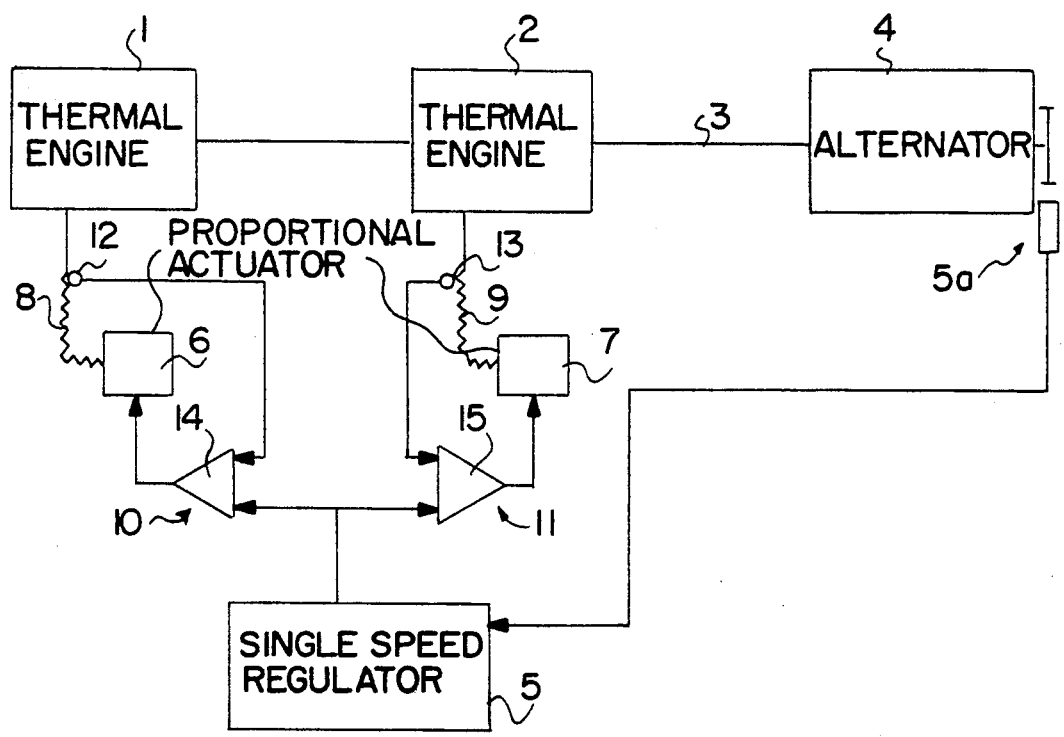
FIG. 3 shows a block diagram illustrating a control device according to the invention.

To solve these problems, the control device according to the invention, shown in FIG. 3, comprises means 10 and 11 respectively for the closed-loop servo-control of the position of each control member 8, 9 as a function of the output signal from the regulating means 5.

These servo-control means are interposed between the regulating means 5 and the actuators 6 and 7 acting on the members controlling the injection of fuel into the engines 1 and 2.

According to one embodiment, the servo-control means comprise, for each engine, means 12 and 13 respectively for determining the actual position of the corresponding control member, for example 8 or 9, and means 14 and 15 respectively for comparing the output signal from these determining means with an output signal from the regulating means 5, this signal representing the desired theoretical position.

The output of the comparison means 14 and 15 is connected to the actuators 6 and 7 constituting the adjustment means, in order to compensate any deviation between the actual position and the desired theoretical position.

It will thus be seen that, in this embodiment, the servo-control means for each control member receive the same output signal from the regulating means 5.

Thus, a true closed-loop position servo-control is obtained for each control member by the use of the actuators of the state of the art which operated in the open-loop mode.

The deviation of position between the two members, and therefore the deviation of the power delivered by the engines adjusted identically, thereby depends on the measurement accuracy of the sensors forming the means for determining the actual position of the control members and on the accuracy of the servo-control which can be of a high order if a controller of the integral type is used.

As an exemplary embodiment, a speed regulator of the electronic analog 2301A type manufactured by Messrs. WOODWARD GOVERNOR COMPANY and proportional electromechanical actuators of the 3199 type manufactured by this same company can be used in the device according to the invention.

Figure 4:
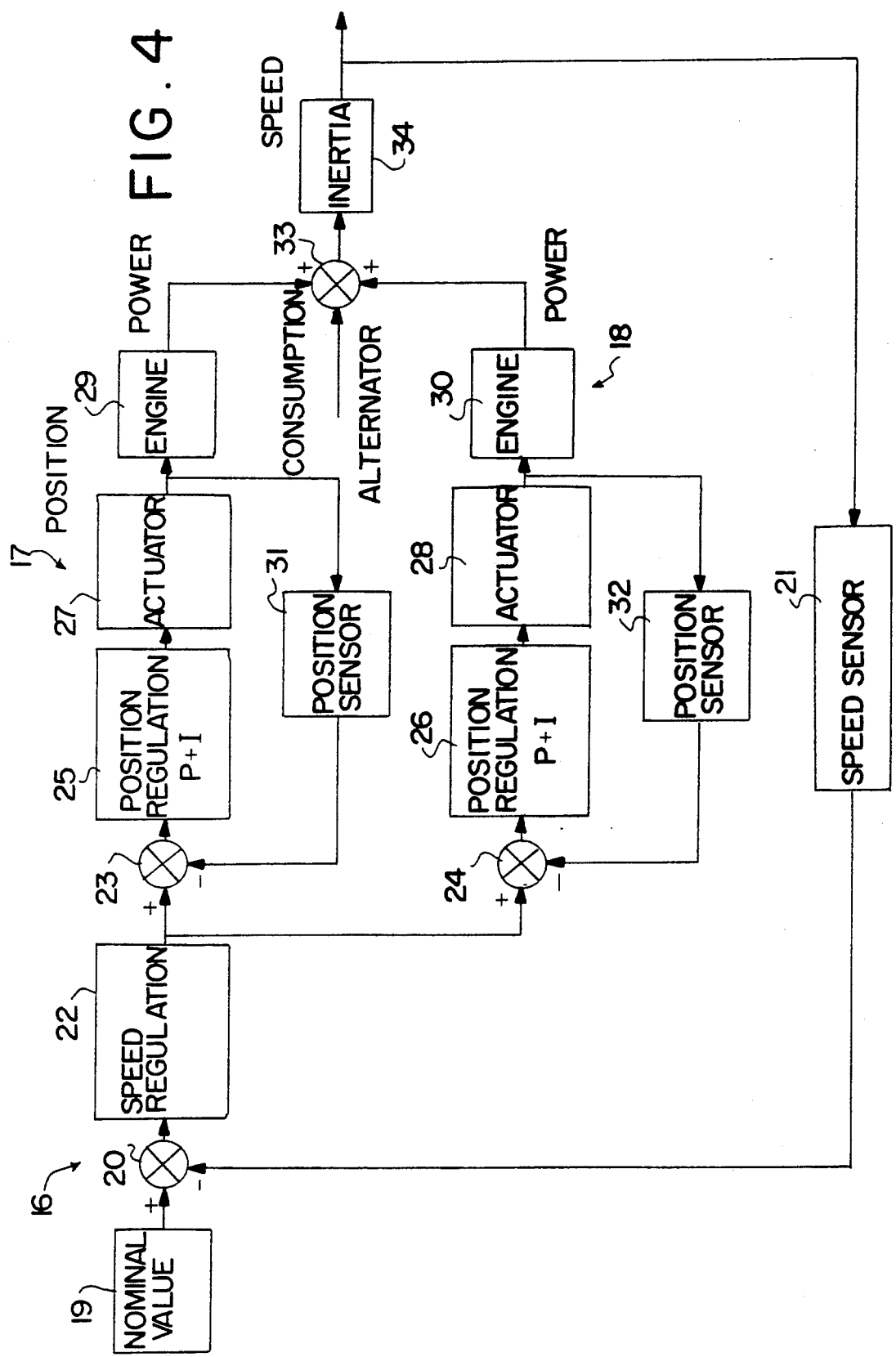
FIG. 4 shows a block diagram illustrating the operation of a generating unit equipped with a control device according to the invention.

A block diagram illustrating the operation of a unit equipped with a control device according to the invention is shown in FIG. 4.

This block diagram comprises three looped servo-mechanisms 16, 17 and 18 respectively. The first looped system 16 consists of a general speed regulation from a nominal value, indicated at 19, which fixes the frequency of the electrical current delivered by the alternator. This nominal value is applied to one input of comparison means 20, the other input of which receives information from at least one speed sensor 21 indicating the rotational speed of the unit. This loop operates in the regulating mode in order to keep the speed of the unit constant.

The output of the comparison means 20 is connected to speed-regulating means consisting, for example, of the regulator of the 2301A type mentioned above and designated by the reference 22.

The output of this regulator is connected to the two servo-control loops 17 and 18 in order to servo-control the position of the member controlling the injection of fuel into each engine as a function of the output signal of the regulating means. The servo-controls 17 and 18 are obtained by position-adjusting means controlled in response to the output signal from the regulating means.

Thus, the means for adjusting the position of the member controlling the injection of fuel into each engine are controlled in response to a single output signal from the regulating means.

Each loop possesses comparison means 23 and 24 respectively receiving the output of the regulating means 22 at one input. The output of the comparison means 23 and 24 is connected to position-regulating means 25 and 26 respectively, the output of which is connected to the means for adjusting the position of the control member which consist, for example, of the actuators 27 and 28.

The output of these adjustment means is connected, on the one hand, to the member controlling the injection of fuel into each engine, designated respectively by the references 29 and 30, and, on the other hand, to means 31 and 32 for determining the position of this control member, the output of which is connected to the other input of the comparison means 23 and 24 respectively, so as to ensure the closed-loop servo-control of the position of these control members as a function of the output signal from the regulating means.

It is thus possible to compensate any deviation between the actual position and the desired theoretical position of these control members.

The outputs of the blocks 29 and 30 are connected to two inputs of an adder or summer 33, another input of which receives information relating to the consumption at the alternator, the output of this adder 33 being connected to a block 34 displaying the inertia of the assembly as a whole.

The output of this block 34 is connected to the input of the abovementioned speed sensor 21, in order to re-close the general speed servo-control loop.

The injection of fuel into the engines 29 and 30 determines the powers which these engines deliver.

The mechanical inertia 34 of the shafting is subjected to the two drive torques of the engines 29 and 30 and to the counter-torque of the alternator corresponding to the power of the auxiliary equipment connected to its terminals. This torque difference is determined by the adder 33 and is applied to the input of the inertia block 34, as a result of which there are variations in speed of the unit.

The measurement of the rotational speed is provided by the abovementioned speed sensor 21, in order to re-close the general speed-regulating loop.

The consumption of the alternator constitutes the disturbing element of the regulating loop 16.

When the generating unit is used as an emergency unit requiring very rapid starting, it is important that the position-regulating means 25 and 26 have desaturation working by integral action.

Figure 5:
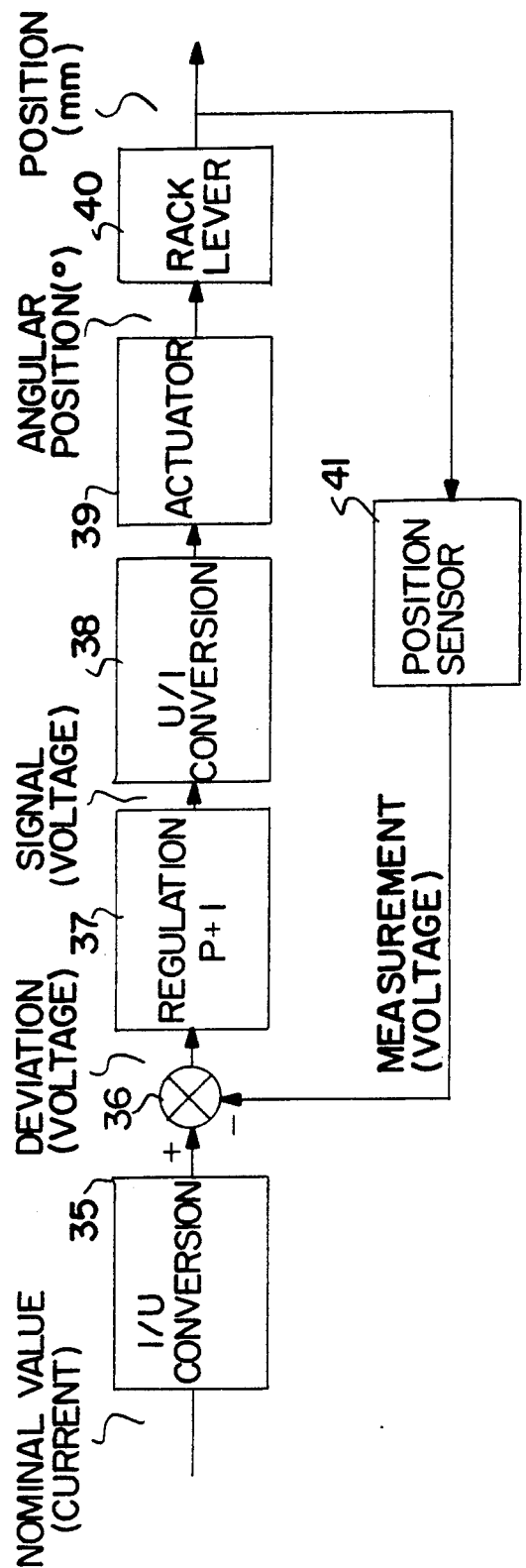
FIG. 5 shows a block diagram illustrating a position servo-control loop of a control device according to the invention.

FIG. 5 shows a more detailed block diagram of the loop for the servo-control of the position of each control member as a function of the output signal from the regulating means.

The output of the regulating means is applied, for example, to a current/voltage converter 35, the output of which is connected to the input of a comparator 36 corresponding to the comparator 23 or 24 mentioned in respect of FIG. 4.

The output of this comparator 36 is connected to the input of regulating means 37, the output of which is connected to voltage/current conversion means 38. The output of these conversion means is connected to the means 39 for adjusting the position of the member 40 controlling the injection of fuel into each engine, these adjustment means consisting, for example, of an actuator of the 3199 type, as mentioned above, and the control member consisting, for example, of a control rack.

The output of this block 40 is connected to the input of a position sensor 41 corresponding to the position sensor 31 or 32 of FIG. 4, this position sensor being connected to the other input of the comparison means 36.

The rest of the description is a modelling of the above-described means in order to study in more detail the operation of such servo-control means with the special equipment mentioned.

It was stated above that the speed regulator could consist of a regulator of the 2301A type which is manufactured by Messrs. WOODWARD and the output current of which varies from 20 to 160 mA on one or two actuators, the input impedance of which is between 30 and 35 ohms.

The actuators can consist of actuators of the 3199 type, manufactured by the same company, which have an input impedance of 30 to 35 ohms and a time constant of 70 to 90 ms and of which the input varies from 20 to 160 mA and the angle used is 21.7° at the rotary output.

The position sensors used can be sensors manufactured by Messrs. SCHAEVITZ, the output of which varies from 0 to 10 V (or from 4 to 20 mA) for a stroke of 0 to 40 mm with a rack travel of 26 mm (corresponding to 21.7° of rotation of the control shaft of the actuator). This position sensor can be of the LVDT type with a modulator/demodulator operating at 3.5 kHertz.

The servo-control loop can be modelled, for example, in order to conduct tests on the position servo-control chain for each rack.

Thus, for example, the input current/voltage converter can deliver over a resistor of 30 ohms corresponding to the impedance of an actuator of the 3199 type mentioned above.

The voltage at the terminals of this resistor serves as a reference point for the two servo-control chains, to avoid having a shift linked to the thermal drifts.

If appropriate, these thermal drifts of the resistor can be compensated by the integral action of the abovementioned regulator of the 2301A type.

This input conversion can be completed by an amplification of a coefficient of 1.67, making it possible to provide a nominal value varying from 0 to 10 volts as a function of the output signal of the regulator varying between 0 and 200 mA. This makes it possible to obtain a coefficient $\alpha$:

$$\alpha = 0.03 \times 1.67 = 0.05 \text{ volts per mA}.$$

The position sensors can be adjusted to obtain signals varying between 0 and 200 mA for a stroke varying from 0 to 40 mm.

The effective travel of the rack extends over 26 mm, assumed to be centred within the range of the sensor, and a useful current, the range of variation of which extends over 13 mA, is therefore used. This current has to be converted into voltage for a comparison with the nominal signal. It is possible to tap the voltage at the terminals of a precision resistor of 600 ohms, in order to remain at a maximum current below 160 mA at the output of the regulator. The displacement/measurement transfer then corresponds to:

$$\frac{20}{40} \times 0.6 = 0.3 \text{ V/mm}$$

The current amplifier ensuring the conversion of the output voltage of the position regulator (0 to 10 V) into control current for the actuator 3199 (desired up to 200 mA) has a coefficient of 20 mA per volt.

The control lever of the rack converts the rotation of the actuator 3199 (21.7°) into a translational movement of the rack (26 mm), that is to say at a coefficient of 1.2 mm/degree.

The rotation of the output shaft of the actuator of the 3199 type is 21.7° for an input-current range of 20 to 160 mA, that is to say 140 mA.

Also taken into account in addition to the time constant of 90 ms indicated by the supplier is a second order corresponding to the pilot distributor (mass-spring assembly of this device), of which it is assumed here that the natural frequency is 10 Hertz and the damping reduced to 0.25 (amplification of 2 at the resonant frequency) to allow for a normal phase shift provided by this device.

There is therefore:

$$F(p) = \frac{0.155}{1 + 0.09\,p} + \frac{1}{1 + 0.5\,p/60 + (p/60)^2} \text{ degrees per mA}$$

The regulator 37 has a transfer function of the type:

$$C(p) = G\frac{1 + Tip}{Tip}$$

where
$P = j\omega$ (variable),
$G$ represents the gain (proportional) and $Ti$ the integral time constant.

Figure 6:
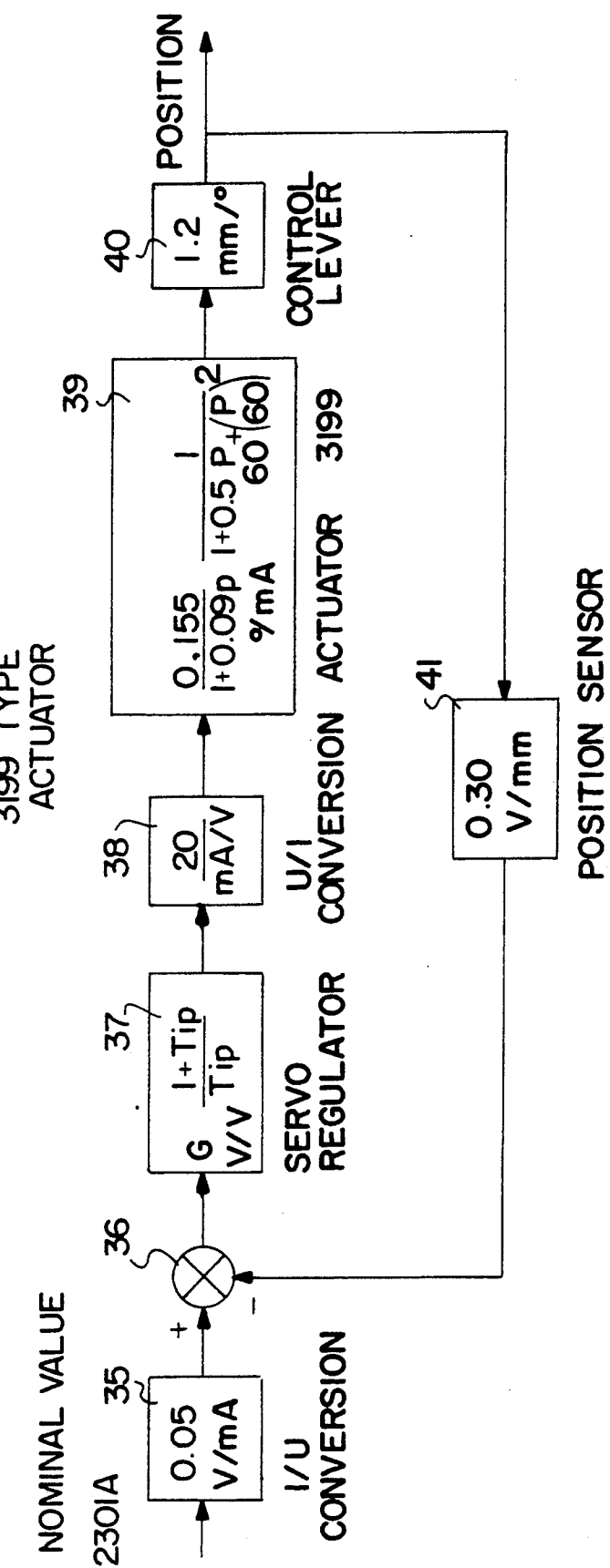
FIG. 6 shows a block diagram of a servo-control loop of the control device according to the invention for a special use.

This makes it possible to obtain the block diagram shown in FIG. 6, which corresponds to that of FIG. 5 and in which the various transfer functions mentioned above have been entered.

During development of the device, the criterion of the maximum overvoltage is sought in the BLACK diagram, the limit being an overvoltage of 1 dB in order to take into account the phase shifts not allowed for explicitly in the transfer functions of the block diagram shown in FIG. 6.

The transfer function of the device in the open-loop mode is equal to:

$$\frac{1.12}{(1 + 0.09\,p)\,[1 + 0.05\,P/60 + (P/60)^2]} \; G\frac{1 + Tip}{Tip}$$

The selected setting is:
$Ti = 0.2$ seconds
$G = 1.35$

Figure 7:
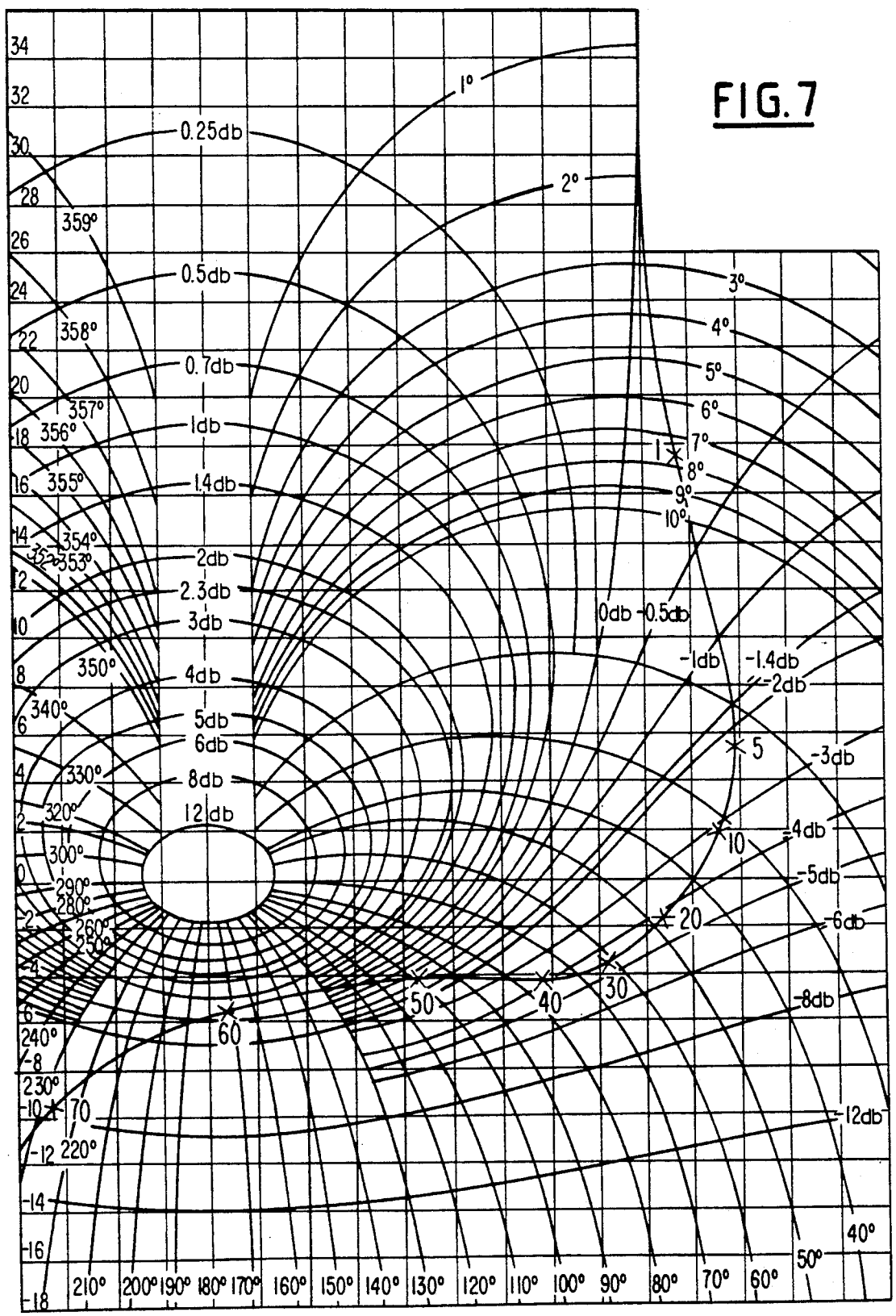
FIG. 7 and 8 show respectively a diagram and a BODE diagram of device according to the invention shown in FIG. 6.

This leads to the representation of FIG. 7.

Figure 8:
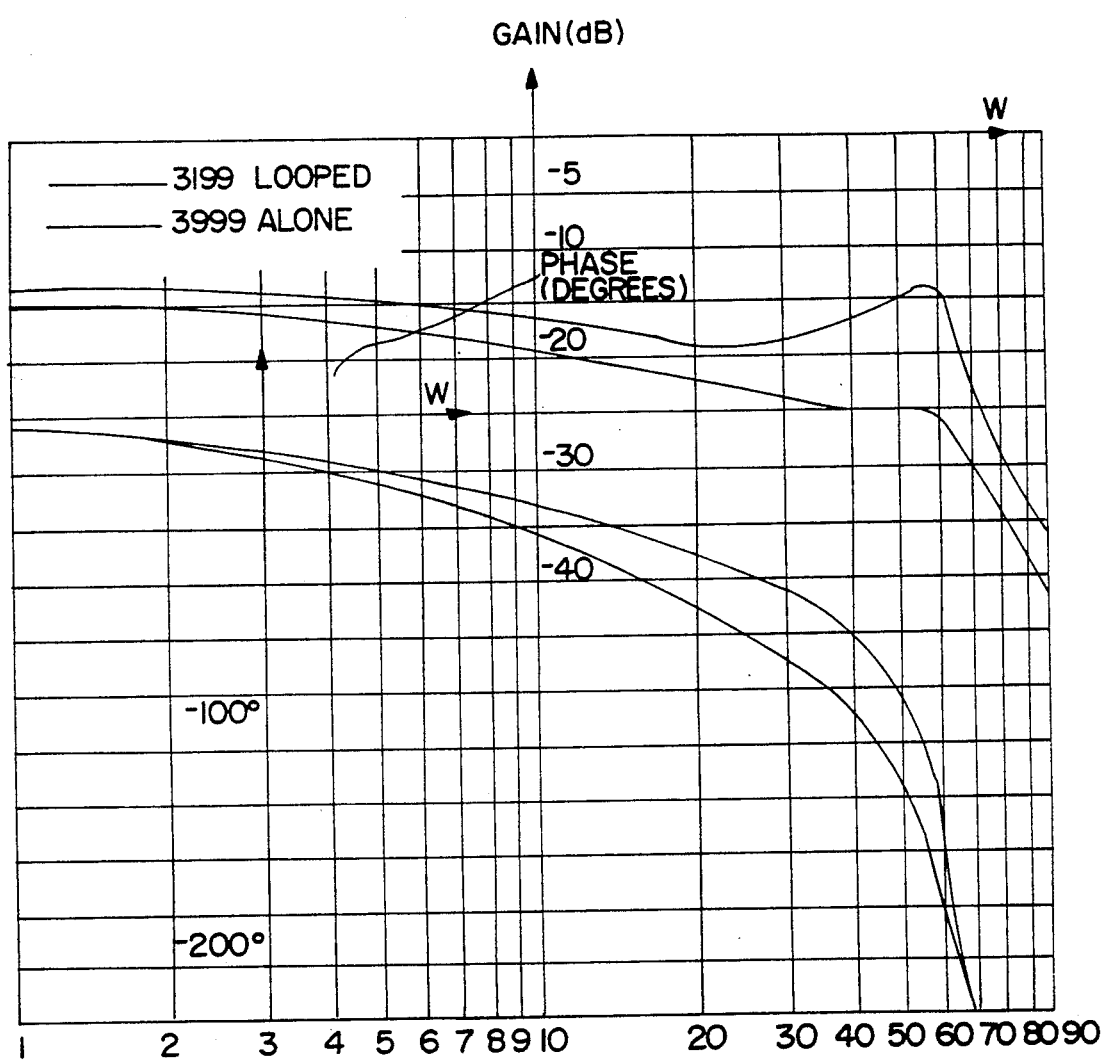

FIG. 8 shows that the dynamics of the actuator looped with its position servo-control (represented by a thick line) is better than when it is alone (represented by a thin line).

This proves that the introduction of a closed position servo-control loop in no way impairs the performance of the speed regulation and therefore makes it possible to obtain a device of which the speed-regulating characteristics are not adversely affected, but the characteristics of load distribution on the engines are greatly improved in relation to those of a known device.

What is claimed is:

1. Device for controlling the operation of at least two thermal engines coupled to the same drive shaft of an alternator, comprising means for regulating the rotational speed of the engines and means for adjusting the position of a member controlling the injection of fuel into each engine, which are controlled in response to an output signal from the regulating means, the device further including means for the closed-loop servo-control of the position of each control member as a function of the output signal from the regulating means.

2. Device according to claim 1, wherein the servo-control means comprises a controller of the integral type.

3. Device according to claim 1, wherein the servo-control means comprise, for each engine, means for determining the actual position of the corresponding control member and means for comparing the output signal from these determining means with an output signal from the regulating means which represents the desired theoretical position, the output of the comparison means being connected to the adjustment means, in order to compensate any deviation between the actual position and the desired theoretical position.

4. Device according to any one of claims 1 to 3, wherein the servo-control means for each control member receive the same output signal from the regulating means.

* * * * *